United States Patent
Kono et al.

(10) Patent No.: US 9,751,219 B2
(45) Date of Patent: Sep. 5, 2017

(54) UMBILICAL MEMBER CLAMPING DEVICE FOR CLAMPING UMBILICAL MEMBERS VIA ELASTIC BODY

(71) Applicant: FANUC CORPORATION, Minamitsuru-gun, Yamanashi (JP)

(72) Inventors: Eiji Kono, Yamanashi (JP); Hidenori Kurebayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/840,215

(22) Filed: Aug. 31, 2015

(65) Prior Publication Data

US 2016/0067870 A1 Mar. 10, 2016

(30) Foreign Application Priority Data

Sep. 5, 2014 (JP) ................... 2014-181248

(51) Int. Cl.
| | |
|---|---|
| *F16L 3/10* | (2006.01) |
| *B25J 19/00* | (2006.01) |
| *F16L 3/12* | (2006.01) |
| *F16L 3/23* | (2006.01) |

(52) U.S. Cl.
CPC ......... *B25J 19/0025* (2013.01); *F16L 3/1016* (2013.01); *F16L 3/1222* (2013.01); *F16L 3/23* (2013.01); *Y10S 901/23* (2013.01)

(58) Field of Classification Search
CPC .... B25J 19/0025; F16L 3/1016; F16L 3/1222; F16L 3/23
USPC ....................... 248/65, 72, 74.3, 52; 74/490.2
See application file for complete search history.

(56) References Cited

U.S. PATENT DOCUMENTS

| | | | | |
|---|---|---|---|---|
| 2,298,560 A | * | 10/1942 | Harrison | .................. F16L 3/23 |
| | | | | 174/40 CC |
| 2,542,442 A | * | 2/1951 | Weber | ..................... F16L 3/223 |
| | | | | 248/68.1 |
| 4,426,754 A | * | 1/1984 | Smith | ...................... F16L 3/23 |
| | | | | 24/115 R |
| 4,705,243 A | * | 11/1987 | Hartmann | ............ B23K 11/362 |
| | | | | 248/160 |
| 5,406,032 A | * | 4/1995 | Clayton | ................. H02G 3/083 |
| | | | | 174/151 |
| 5,606,262 A | * | 2/1997 | Montalbano | ............. B25J 9/041 |
| | | | | 324/750.22 |
| 5,742,982 A | * | 4/1998 | Dodd | ...................... F16G 11/00 |
| | | | | 24/16 R |
| 5,816,736 A | * | 10/1998 | Kroulik | ................ B25J 19/0025 |
| | | | | 248/229.1 |

(Continued)

FOREIGN PATENT DOCUMENTS

JP 2013-202696 A 10/2013

*Primary Examiner* — Muhammad Ijaz
(74) *Attorney, Agent, or Firm* — RatnerPrestia

(57) ABSTRACT

An umbilical member clamping device includes a base member attached to a body of a robot, an elastic body provided so as to surround a periphery of an umbilical member bundle including umbilical members, a clamp member secured to the base member so as to press the umbilical member bundle to the base member via the elastic body, and an insert member inserted to a corner portion of a space which receives the umbilical member bundle and which is defined by the clamp member and the base member when the clamp member is secured to the base member.

2 Claims, 6 Drawing Sheets

(56) References Cited

U.S. PATENT DOCUMENTS

| | | | |
|---|---|---|---|
| 8,820,767 B1* | 9/2014 | Osborne | B60G 11/225 280/124.166 |
| 2005/0172606 A1* | 8/2005 | Wehler | B25J 19/0025 59/78.1 |
| 2008/0209975 A1* | 9/2008 | Zinelli | B21D 39/048 72/352 |
| 2012/0111135 A1* | 5/2012 | Ichibangase | B25J 17/0283 74/490.06 |
| 2013/0255424 A1* | 10/2013 | Kume | B25J 19/00 74/490.01 |
| 2014/0013893 A1* | 1/2014 | Asano | B25J 18/00 74/490.02 |
| 2014/0130631 A1* | 5/2014 | Kume | H02G 11/00 74/490.02 |
| 2014/0332249 A1* | 11/2014 | Barna | H02G 3/32 174/68.3 |
| 2015/0246449 A1* | 9/2015 | Sakai | B25J 19/0025 74/490.02 |

* cited by examiner

UMBILICAL MEMBER CLAMPING DEVICE FOR CLAMPING UMBILICAL MEMBERS VIA ELASTIC BODY

BACKGROUND ART

1. Technical Field

The present invention relates to an umbilical member clamping device for clamping a plurality of umbilical members, which is used in an industrial robot.

2. Description of the Related Art

In an industrial robot, various umbilical members are attached to the body of the robot. Examples of the umbilical members include a cable for supplying power or signals to a motor for driving a joint shaft of the robot, and a tube for supplying power or cooling water to an external device such as a welding gun or hand attached to a tip end of an arm.

Umbilical member clamping devices for securing such umbilical members to a body of a robot have been known. The umbilical members secured to the body of the robot may receive a pulling force depending on movement of the robot. Thus, in order to tightly secure the umbilical members and to prevent the umbilical members from being damaged, the umbilical member clamping devices for securing the umbilical members via elastic bodies has been widely used.

FIG. 10 shows an umbilical member clamping device 50 according to a first related art. The umbilical member clamping device 50 includes a base member 51 attached to the body of a robot, a clamp member 53 secured to the base member 51 by bolts 52, and an elastic body 54 provided in a space defined between the clamp member 53 and the base member 51. The elastic body 54 is comprised of three elastic body blocks 541, 542, and 543. The elastic body blocks 541, 542, and 543 have a plurality of grooves each having a semicircular section, and are assembled so that a plurality of through-holes 55 are defined in the elastic body 54. Each through-hole 55 is sized in accordance with the dimensions of umbilical members 56 so that the through-holes 55 can receive the umbilical members 56, respectively. JP2013-202696A discloses an umbilical member clamping device for clamping umbilical members via such elastic body blocks.

FIG. 11 shows an umbilical member clamping device 50 according to a second related art. The umbilical member clamping device 50 includes an elastic body 54 provided so as to surround a bundle of a plurality of umbilical members 56.

In the umbilical member clamping device 50 according to the first related art, the through-holes 55 are formed in accordance with the shape and dimension of the umbilical members 56. Thus, a wide variety of elastic body blocks 541, 542, and 543 should be prepared to clamp the umbilical members 56 having different shapes or dimensions. This results in an increase in cost, and also results in increased dimensions of the umbilical member clamping device 50. In the umbilical member clamping device 50 according to the second related art, the umbilical members 56 may be collapsed by a pressing force F which is applied to the umbilical members 56 when the clamp member 53 is secured to the base member 51 (see FIG. 11).

Therefore, low-cost umbilical member clamping devices which can prevent umbilical members from deforming have been demanded.

SUMMARY OF THE INVENTION

A first aspect of the present invention provides an umbilical member clamping device used to attach a plurality of umbilical members to an industrial robot, comprising: a base member attached to a body of the robot; an elastic body provided so as to surround a periphery of an umbilical member bundle including the umbilical members; a clamp member secured to the base member so as to press the umbilical member bundle to the base member via the elastic body; and an insert member inserted to a corner portion of a space which receives the umbilical member bundle and which is defined by the clamp member and the base member when the clamp member is secured to the base member.

A second aspect of the present invention provides the umbilical member clamping device according to the first aspect, wherein the elastic body includes a sheet-like member wound around the umbilical member bundle.

A third aspect of the present invention provides the umbilical member clamping device according to the first or second aspect, wherein the clamp member has a shape which curves so as to project in an opposite direction from the base member.

A fourth aspect of the present invention provides the umbilical member clamping device according to any one of the first to third aspects, wherein the elastic body has a hollow cylindrical shape.

These and other objects, features and advantages of the present invention will become more apparent in light of the detailed description of exemplary embodiments thereof as illustrated in the drawings.

DETAILED DESCRIPTION OF THE INVENTION

Figure 1:
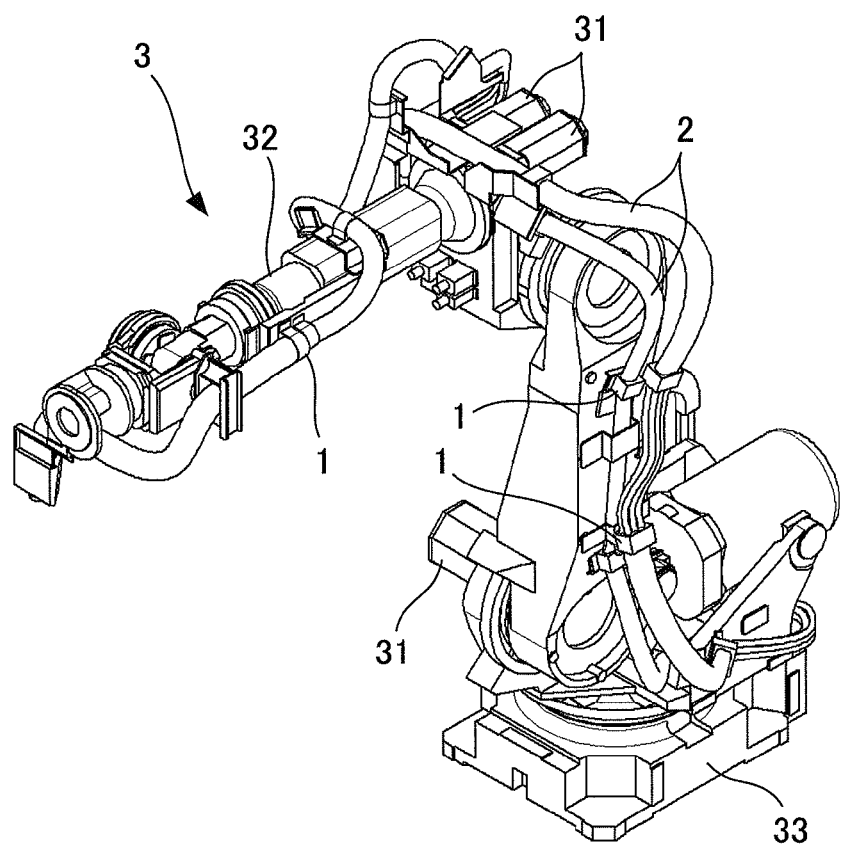
FIG. 1 is a perspective view of a robot to which bundles of umbilical members are attached using umbilical member clamping devices according to the present invention.

Embodiments of the present invention will be described below with reference to the accompanying drawings. To facilitate understanding of the present invention, illustrated constituent elements may be changed in scale as necessary. Further, similar or corresponding constituent elements are designated with the same reference numerals.

FIG. 1 is a perspective view of an industrial robot (hereinafter simply referred to as "the robot") 3 to which umbilical member bundles 2 are attached using umbilical member clamping devices 1 according to the present invention. The robot 3 is, for example, a 6-axis vertical articulated robot as shown in FIG. 1. However, the umbilical member clamping devices 1 can be applied to any type of robot to which umbilical members 21 should be attached.

Figure 2:
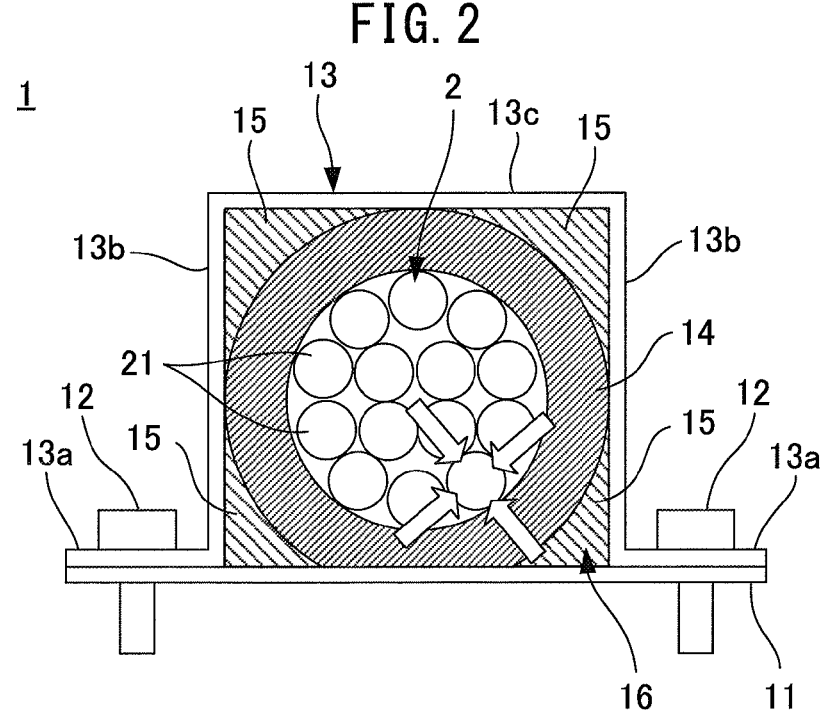
FIG. 2 is a sectional view of an umbilical member clamping device according to one embodiment.

Each umbilical member bundle 2 is a bundle comprised of a group of umbilical members 21 (see FIG. 2). Each umbilical member 21 is, for example, a cable for supplying power or signals to a motor 31 for driving articulated shafts of the robot 3, or a tube for supplying power or cooling water to an external device such as a welding gun or hand attached to a tip end of an arm 32.

The umbilical member bundle 2 generally extends over the entire body of the robot 3, i.e., from the base 33 to the tip end of the arm 32 of the robot 3. The umbilical member bundle 2 is attached to the robot 3 so that the robot 3 is prevented from interfering with the umbilical member bundle 2 when moving. The umbilical member bundle 2 may be provided in the inner space of the body of the robot 3. The umbilical member bundle 2 is secured to the body of the robot 3 at several positions by the umbilical member clamping devices 1. The number of umbilical member clamping devices 1 and the attachment positions are not limited to the illustrated example.

FIG. 2 shows the umbilical member clamping device 1 according to a first embodiment. FIG. 2 shows a cross section of the umbilical member clamping device 1, which is perpendicular to the longitudinal direction of the umbilical member bundle 2. The umbilical member clamping device 1 includes a base member 11 attached to the body of the robot 3, a clamp member 13 secured to the base member 11 by bolts 12, an elastic body 14 provided to surround the periphery of the umbilical member bundle 2, and insert members 15 inserted to corner portions of a space which is defined by the base member 11 and the clamp member 13 and which receives the umbilical member bundle 2.

The base member 11 has a shape corresponding to the shape of the mounting surface of the body of the robot 3. The base member 11 is, for example, a substantially flat plate member. The base member 11 is formed with holes (not shown) through which the bolts 12 can pass. The base member 11 may be a part of the body of the robot 3.

The clamp member 13 has a pair of flange portions in the form of flat plate, which have through-holes (not shown) for the bolts 12 and which abut with the base member 11, a pair of side walls 13b which substantially orthogonally extend from the respective flange portions 13a in the opposite direction from the base member 11, and a top wall 13c which extends substantially in parallel with the base member 11 and which interconnects the pair of side walls 13b. The side walls 13b and top wall 13c of the clamp member 13 and the base member 11 define a receiving space 16 for receiving the umbilical member bundle 2 and the elastic body 14.

Fastening means for fastening the clamp member 13 to the base member 11 may be any fastening means other than the bolts 12. The fastening means may be, for example, a hinge-shaped fastener or a fastener made of a non-metal.

The elastic body 14 has a hollow and substantially cylindrical shape, and has an inner face having a shape corresponding to the contour of the umbilical member bundle 2. The elastic body 14 is made of a material which is more easily elastically deformed than the base member 11, the clamp member 13, and the insert member 15. When the umbilical member bundle 2 is secured to the robot 3 by the umbilical member clamping device 1, the umbilical member bundle 2 receives a pressing force so as to be pressed against the base member 11 via the elastic body 14. Further, when the robot 3 is in operation, a pulling force may be applied to the umbilical member bundle 2. The elastic body 14 buffers the pressing force and pulling force to be applied to the umbilical member bundle 2, thereby preventing the umbilical member bundle 2 from being damaged. In one embodiment, the elastic body 14 may be a sheet-like member wound around the umbilical member bundle 2.

As shown in FIG. 2, the insert members 15 have a substantially triangular section having two straight sides, which are perpendicular to each other, and an arc-shaped curved side interconnecting the straight sides. In this embodiment, each insert member 15 is provided in the respective corner portions of the inner space which has a rectangular section and which is defined by the base member 11 and the clamp member 13. The insert members 15 limit the receiving space 16, which receives the elastic body 14 and the umbilical member bundle 2, to a substantially circular shape in cross-section. The insert members 15 may have the same dimensions. Alternatively, as shown in FIG. 2, the dimensions of the insert members 15 may be determined so that, for example, the insert members 15 adjacent to the top wall 13c of the clamp member 13 are larger than the insert members 15 adjacent to the base member 11.

According to the umbilical member clamping device 1 according to the present embodiment, the insert members 15 disposed in the corner portions of the receiving space 16 disperse the directions in which a pressing force exerts from the clamp member 13 to the umbilical members 21. This can prevent the umbilical members 21 from excessively deforming. The operation and effect of the umbilical member clamping device 1 will be described below in detail with reference to FIGS. 3A to 5B.

Figure 3A:
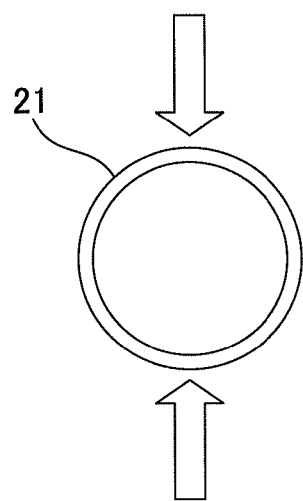
FIG. 3A is a view showing forces applied to an umbilical member.
Figure 3B:
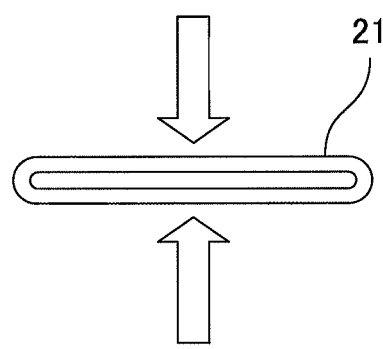
FIG. 3B is a view showing forces applied to an umbilical member.

For the sake of simplicity, the umbilical member 21 which is a hollow tube will be discussed by way of example. As shown by the arrows in FIG. 3A, the umbilical member 21 is relatively easily deformed when receiving pressing forces in two directions opposite to each other. As shown in FIG. 3B, when the umbilical member 21 is deformed and then collapsed, the umbilical member 21 does not adequately function as a path for supplying, for example, air and cooling water. Further, the possibility that the umbilical member 21 may be broken is increased.

Figure 4:
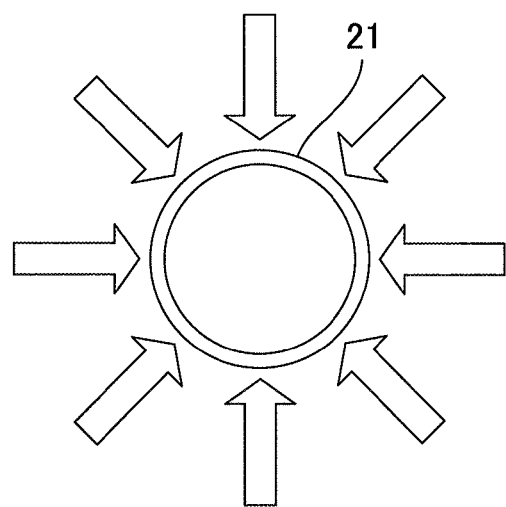
FIG. 4 is a view showing forces applied to an umbilical member.

Further, as shown in FIG. 4, when the umbilical member 21 receives pressing forces in various directions, forces tending to deform the umbilical member 21 cancel each other out, and accordingly, the umbilical member 21 is prevented from being deformed.

Figure 5A:
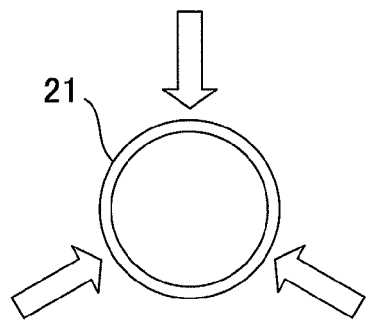
FIG. 5A is a view showing forces applied to an umbilical member.
Figure 5B:
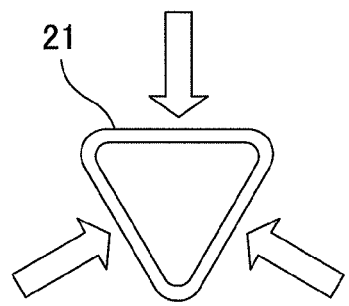
FIG. 5B is a view showing forces applied to an umbilical member.
Figure 6:
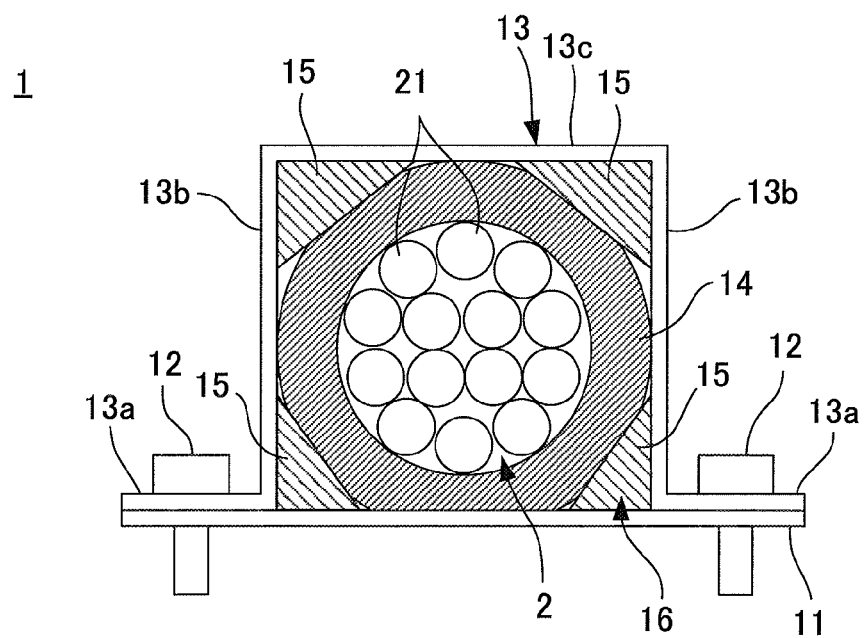
FIG. 6 is a sectional view of an umbilical member clamping device according to another embodiment.
Figure 7:
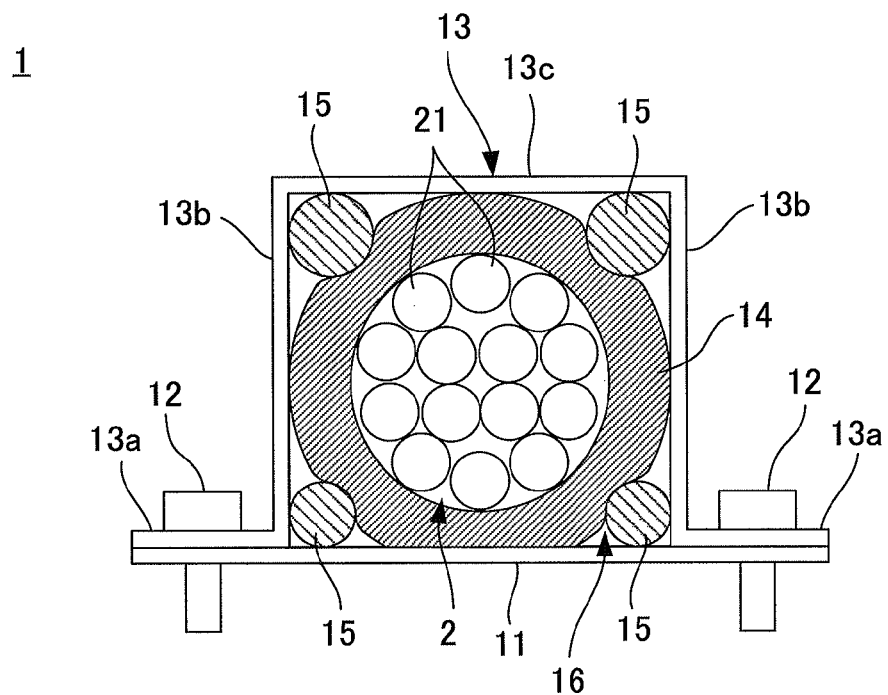
FIG. 7 is a sectional view of an umbilical member clamping device according to still another embodiment.

As shown in FIG. 5A, in the case where the umbilical member 21 receives pressing forces in three directions which are at an angle of 120° relative to each other, although the umbilical member 21 is relatively easily deformed in comparison with the case shown in FIG. 4, the extent of deformation is still relatively small, and the inner space can be maintained to a certain extent (see FIG. 5B). In this way, when pressing forces are applied to the umbilical member 21 in at least three distributed directions, the deformation of the umbilical member 21 can be reduced. It should be noted that, if the umbilical member 21 is a solid cable, e.g., an electric wiring, the umbilical member 21 is generally more difficult to be deformed than a hollow tube, but has the same tendency of behavior as the hollow tube when receiving a pressing force.

Figure 11:
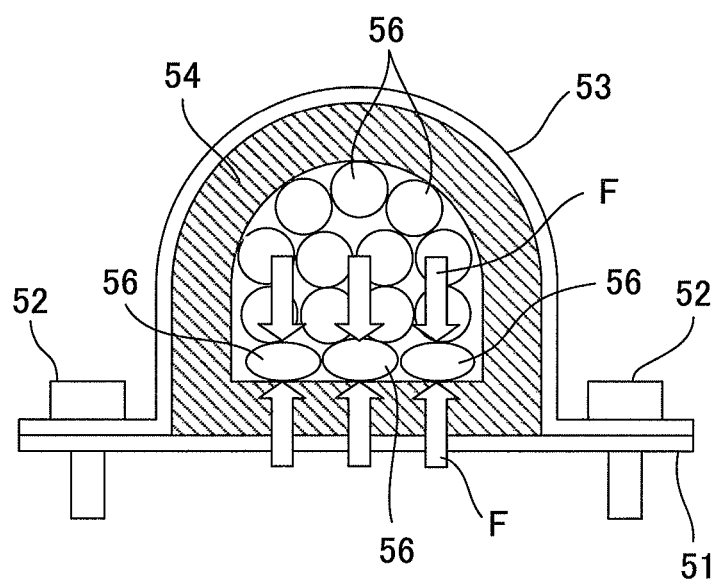
FIG. 11 is a sectional view of an umbilical member clamping device according to a second related art.

In the second related art described with reference to FIG. 11, the elastic body 54 is deformed into a flat plate-like shape extending in parallel with the base member 51, and the umbilical member 21 receives the pressing forces F in two opposite directions. As a result, when the pressing forces F are excessively large, umbilical members 56 may be collapsed as illustrated.

By contrast, in the umbilical member clamping device 1 according to the present embodiment shown in FIG. 2, the range of the elastic deformation of the elastic body 14 is limited by the insert members 15 having an arc-shaped curved side, and thus, the elastic body 14 can generally maintain its cylindrical shape. Each umbilical member 21 disposed in the inner space of the elastic body 14 receives pressing forces in various directions, for example, from the curved inner face of the elastic body 14 and from the adjacent umbilical members 21, as shown by arrows in FIG. 2.

The umbilical member clamping device 1 according to the present embodiment has the following advantageous effects.

(1) The insert members 15 inserted in the corner portions of the receiving space 16 can maintain the curved shape of the inner face of the elastic body 14. This can distribute the directions in which pressing forces are applied to the umbilical members 21, and can prevent the umbilical members 21 from excessively deforming.

(2) A group of umbilical members 21 constituting the umbilical member bundle 2 can be freely disposed in the inner space of the elastic body 14, and accordingly, the umbilical member clamping device 1 can be applied to various umbilical members 21 having different shapes and dimensions. This eliminates the need for preparing different elastic bodies in accordance with the type of umbilical members 21.

(3) As the directions in which pressing forces are applied to the umbilical members 21 are distributed according to the present embodiment, friction forces acting on the respective umbilical members 21 increase accordingly. Thus, even when pressing forces applied to the umbilical members 21, which are caused by securing the clamp member 13 to the base member 11, are small, the umbilical members can be sufficiently and tightly fastened. In other words, pressing forces applied by the clamp member 13 can be reduced. Accordingly, the umbilical member clamping device 1 which can further prevent the umbilical members 21 from deforming can be provided.

(4) If the elastic body 14 is formed of sheet-like members, the elastic body 14 can be easily formed. Further, since the sheet-like members can be cut to a necessary length, the dimensions of the elastic body 14 can be easily adjusted. The pressing forces applied from the clamp member 13 to the umbilical members 21 via the elastic body 14 are determined in accordance with the magnitude of restoring force of the elastic body 14. Therefore, the pressing forces applied to the umbilical members 21 can be easily adjusted by adjusting the dimensions of the elastic body 14.

The umbilical member clamping device 1 which can realize the intended operation and effect in accordance with the present invention, is not limited to the embodiment shown in FIG. 2. FIGS. 6 to 9 show the umbilical member clamping devices 1 according to different embodiments. In the umbilical member clamping device 1 shown in FIG. 6, the insert members 15 are columnar members which have a substantially right triangle-shaped section and which are disposed so that their oblique sides abut with the elastic body 14. Further, in the umbilical member clamping device 1 shown in FIG. 7, the insert members 15 are rod-like members having a circular section.

Figure 8:
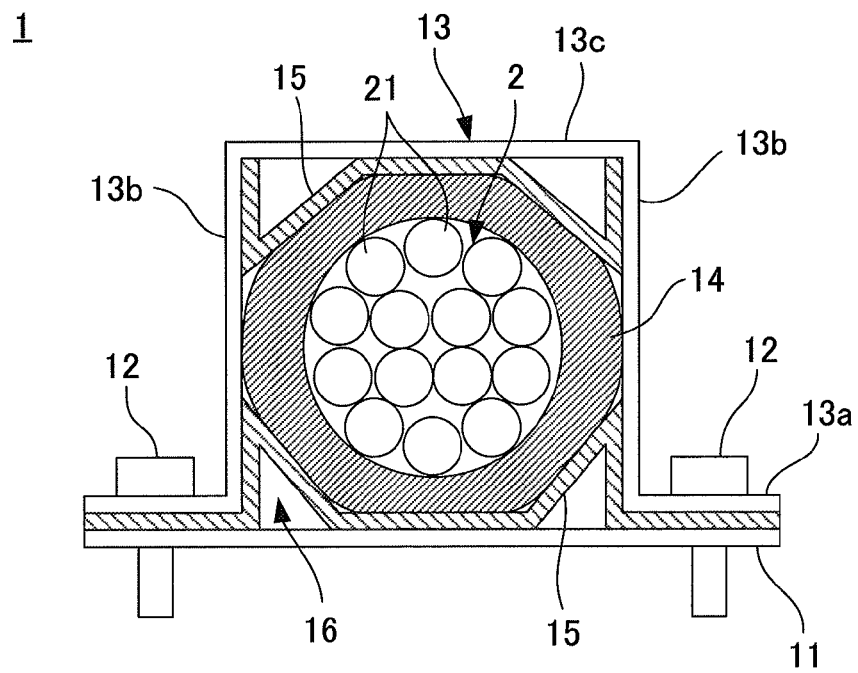
FIG. 8 is a sectional view of an umbilical member clamping device according to still another embodiment.

In the umbilical member clamping device 1 shown in FIG. 8, two insert members 15, which are formed by bending, for example, a metal plate into a generally W-shaped shape, are provided adjacent to the base member 11 and the top wall 13c of the clamp member 13 via the elastic body 14, respectively, and opposite to each other. The insert members 15 may be formed by casting or by welding a plurality of metal plates. The insert members 15 also may be made of resin.

Figure 9:
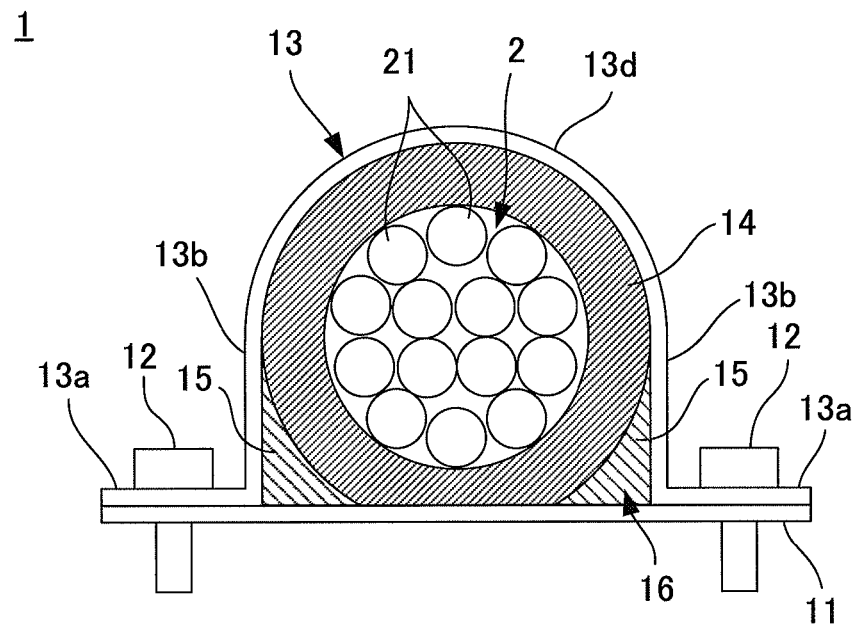
FIG. 9 is a sectional view of an umbilical member clamping device according to still another embodiment.
Figure 10:
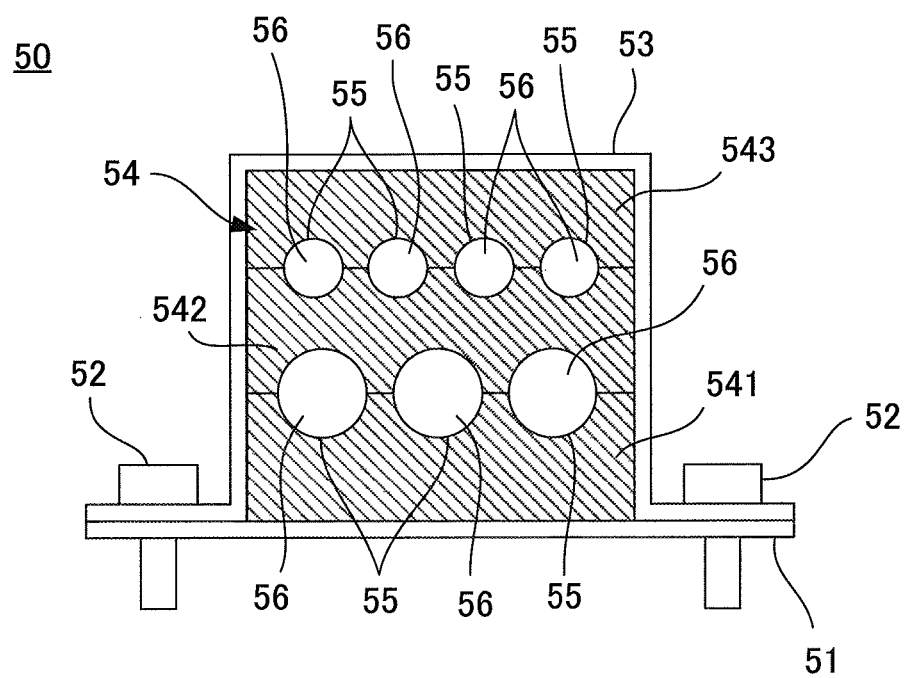
FIG. 10 is a sectional view of an umbilical member clamping device according to a first related art.

In the umbilical member clamping device 1 shown in FIG. 9, the clamp member 13 has a curved wall 13d, which has a semicircular section and which curves so as to project in the opposite directions from the base member 11, in place of the planar top wall 13c. In this case, the elastic body 14 can maintain its outer shape along the curved wall 13d. This eliminates the need for disposing the insert members 15 on the side of the curved wall 13d, and can reduce the cost.

EFFECT OF THE INVENTION

According to an umbilical member clamping device according to the present invention, the directions in which pressing forces are applied to umbilical members are distributed by insert members inserted to the corner portions of a space for receiving the umbilical members. This can prevent the umbilical members from deforming. Further, an elastic body can change its shape in accordance with the shapes of an umbilical member bundle, a clamp member, a base member, and insert members. This eliminates the need for preparing and managing many types of elastic bodies. Thus, a low-cost umbilical member clamping device can be provided.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. An umbilical member clamping device configured to attach a plurality of umbilical members to an industrial robot, comprising:
    a base member configured to be attached to a body of the robot;
    an elastic body configured so as to surround a periphery of an umbilical member bundle including the umbilical members;
    a clamp member secured to the base member and configured so as to press the umbilical member bundle to the base member via the elastic body; and
    a plurality of insert members inserted to a respective corner portion of a space which is configured to receive the umbilical member bundle and which is defined by the clamp member and the base member when the clamp member is secured to the base member, each of the insert members having a first side with a shape corresponding to a shape of the clamp member and a second side having an arc shape corresponding to a shape of the elastic body, the insert members being spaced so as not to contact each other, each of the insert members configured to allow a surface of the elastic body surrounding the umbilical members to contact a surface of the clamp member;

wherein the first side of each of the plurality of insert members comprises a first surface perpendicular to a second surface to define a corner; and wherein the elastic body is provided in a form of a sheet which is configured to wind around the umbilical member bundle.

2. The umbilical member clamping device according to claim 1, wherein the elastic body has a hollow cylindrical shape.

\* \* \* \* \*